Feb. 24, 1959 E. W. MEHRINGER 2,875,326
FREQUENCY DETERMINING MEANS
Filed May 22, 1953

Pins P1, P2, P4, P6, P7 and P8 of Plug Coupler, Fig. 2, engage corresponding socket terminals S1, S2, S4, S6, S7 and S8 when Tube VT2 is replaced by the Plug Coupler.

INVENTOR.
Edward W. Mehringer
BY W. L. Stout
HIS ATTORNEY

United States Patent Office 2,875,326

Patented Feb. 24, 1959

2,875,326

FREQUENCY DETERMINING MEANS

Edward W. Mehringer, Glenshaw, Pa., assignor to Westinghouse Air Brake Company, Wilmerding, Pa., a corporation of Pennsylvania Application May 22, 1953, Serial No. 356,706

4 Claims. (Cl. 250—6)

Figure 2:
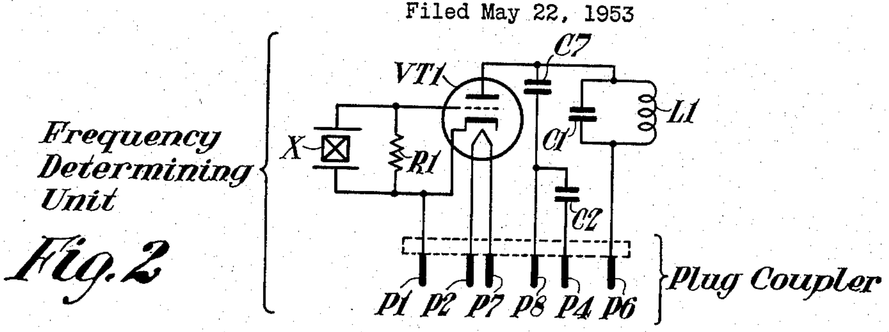

My invention relates to frequency determining means, particularly to means for determining the frequency of transmitting equipment employed in communication systems, and more particularly to a novel and improved arrangement for checking the frequency of transmitting equipment employed in communication systems which utilize a single frequency channel for transmission and reception for all stations.

Many communication systems use frequency modulation and the maintenance of the correct transmitter frequency in these systems is essential. In such systems, a comparatively slight drift of the transmitter oscillator frequency may result in loss of transmitter signal strength with a corresponding decrease in the range of communication, as well as an increased tendency to produce an undesirable amplitude modulation of the transmitted signal. At the receiving station or stations, the departure of the transmitter frequency from its assigned center or normal value will cause distortion in the reproduction of speech transmitted from the transmitter which is improperly tuned. Inaccuracy in the oscillator frequency, if extreme, may cause overloading in the power amplifier tubes ordinarily provided in transmitters of the type here involved, with a subsequent shortening of the life of the tubes.

These conditions arising in frequency modulation communication systems make it essential that the frequency of the transmitters of such systems be checked periodically to insure that the transmitter oscillators have not drifted from their assigned frequency.

In many frequency modulation communication systems, particularly those adapted for mobile use, and employing either radiated or so-called carrier energy transmitted over line wires, it is the usual practice to provide a single carrier frequency for both transmission and reception. That is, each of the transmitters of the various stations in the system are tuned to a given carrier frequency, and likewise, the receiving circuits at each of the stations are tuned to receive the same carrier frequency. Such apparatus must usually be maintained by relatively non-skilled personnel, and it is essential that apparatus provided for determining the frequency of the transmitters be relatively simple in construction and operation, so that it can be easily employed by the persons responsible for the maintenance of the communication equipment. It is also desirable that the frequency determining equipment be made as rugged in construction as possible, due to the fact that it must be transported to the various field locations of the communication equipment, and is accordingly subject to abuse and rough handling. Another requirement of apparatus of this type is that it should preferably not require any external source of power, but instead be actuated by power supplied thereto from the communication equipment itself.

Accordingly, a feature of my invention is the provision of novel and improved means for determining the frequency of transmitters of communication systems.

Another object of my invention is the provision of novel and improved frequency determining means which is in the form of a portable rugged instrument which is simple to apply and operate in connection with communication apparatus.

Another object of my invention is the provision of improved frequency determining means which utilizes power supplied thereto from the communication apparatus with which it is employed.

Other objects of my invention and features of novelty thereof will become apparent from the following specification taken in connection with the accompanying drawing.

In practicing my invention, I provide a frequency determining unit which is arranged to be inserted in the circuit of the receiving apparatus at a communication station, replacing one of the usual electron tube amplifiers which amplifies the incoming carrier frequency. This frequency determining unit includes a standard frequency generator, such as a crystal oscillator, and additionally includes a coupling circuit for coupling an incoming carrier frequency signal to a subsequent amplifier stage in the receiving apparatus so that both the incoming carrier frequency and the frequency of the energy supplied by the standard frequency generator are supplied to the subsequent demodulating circuits of the receiving apparatus. Power for the operation of the standard frequency generator is supplied to the frequency determining unit through the connections which normally supply energy to the operating electrodes of the electron tube which the frequency determining unit replaces in the receiving apparatus. Accordingly, with the frequency determining unit replacing the first carrier frequency amplifier an incoming carrier frequency is passed to the subsequent demodulating circuits together with a standard frequency generated by the standard frequency generator in the frequency determining unit. In the subsequent demodulating circuits of the receiving apparatus, the two frequencies are combined and the difference frequency, or beat frequency is supplied to the associated audio amplifier and loud speaker of the receiving apparatus. The difference or beat frequency between the standard frequency and the incoming carrier frequency accordingly will be heard as a beat note in the loud speaker, and when the two frequencies are sufficiently close together a null or zero beat will be obtained, so that it will be readily apparent to the operator of the apparatus when the standard frequency and the incoming carrier frequency are the same, or at least within plus or minus 16 cycles of each other.

Since communication apparatus is arranged so that the transmitter at a particular station operates on the same frequency as the receiver, it will be apparent that the frequency of the transmitter may be checked by energizing the transmitter with the frequency determining unit in place in the receiver, noting the difference frequency which is reproduced by the loud speaker, and thereafter adjusting the transmitter oscillator frequency by the usual tuning means associated therewith until the difference frequency becomes inaudible, at which time the standard frequency and the carrier frequency will correspond within plus or minus 16 cycles.

I shall describe one form of frequency determining means embodying my invention and shall then point out the novel features thereof in claims.

Figure 1:
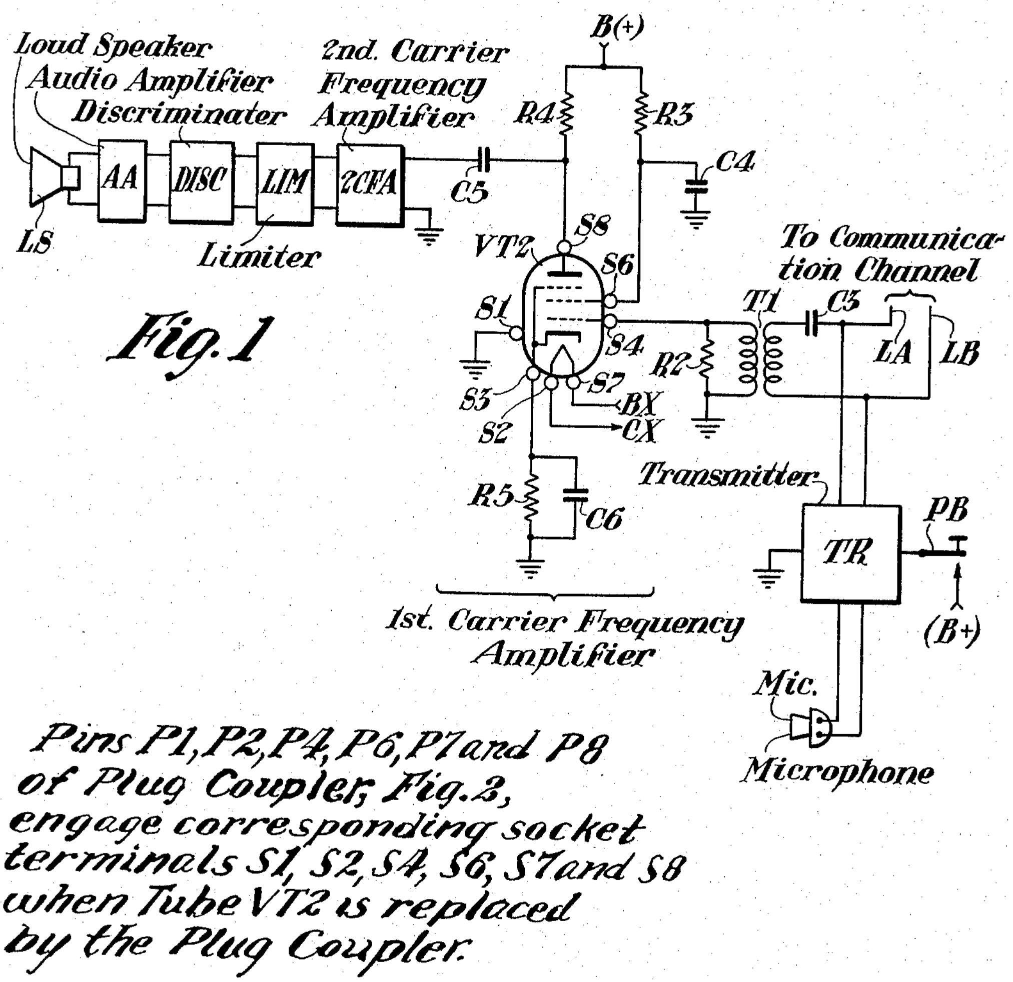

In the accompanying drawings, Fig. 1 shows, in schematic form, a representative type of communication transmitting and receiving apparatus with which a frequency determining unit embodying my invention may be employed, and Fig. 2 shows, in schematic form, a frequency determining unit embodying my invention and adapted to be employed in connection with the apparatus shown in Fig. 1.

Referring to Fig. 1, there is shown, in schematic form, a typical station in a carrier frequency communication system. As shown, there is provided a transmitter TR, which is modulated by microphone MIC, to transmit frequency-modulated energy at a designated carrier frequency, when the push-to-talk button PB is depressed to supply energy to the transmitter. Energy for the operation of the transmitter and receiver is furnished from a suitable source of high voltage direct current, not shown, the positive terminal of which is designated by the reference character B(+), and the negative terminal of which is considered to be grounded. The details of the transmitter TR are not shown, since they may take any one of a number of well known forms, all of which are arranged to include means for tuning the carrier frequency of the transmitter to an assigned frequency. The output of the transmitter is coupled to the communication channel by the connections LA and LB, the communication channel as here shown comprising a pair of suitable conductors extending among each of the stations in the system.

Connected to the conductors LA and LB is a receiving filter including the capacitor C3, the transformer T1, and the resistor R2, which filter is selected and arranged so that only energy of the particular carrier frequency utilized in this system plus the deviation therefrom caused by modulation will be passed by the filter. The output voltage of the filter circuit which appears across the resistor R2 is supplied to the input of a first carrier frequency amplifier, including the vacuum tube VT2. The tube VT2 is shown in conventional manner, the numbered circles designating the corresponding pins on the base of the tube and the terminals in the usual tube socket into which the tube is plugged.

The local transmitter TR may be fed to the receiver circuitry through an attenuating circuit, not shown.

Considering the circuit arrangement of the first carrier frequency amplifier in detail, it will be seen that energy is supplied to the plate of the tube VT2 by a circuit including a resistor R4, through the tube socket terminal S8 to the plate of the tube, and the screen grid is supplied with energy from the direct current source through a dropping resistor R3, which has associated therewith a bypass capacitor C4, to the screen grid of the tube VT2 by way of tube socket terminal S6. The suppressor grid of the tube VT2 is internally connected to the cathode of the tube, while the cathode of the tube is connected by way of socket terminal S3 to ground through the usual biasing circuit including a resistance R5 and a capacitor C6. Tube VT2 is here shown as being of the indirectly-heated type, and energy for the operation of the heater of the tube is furnished from a suitable source of low voltage alternating current, not shown, the terminals of which are designated by the reference characters BX and CX. The heater of tube VT2 is connected to the source BX, CX, by way of the socket terminals S2 and S7. The socket terminal S1 is connected to ground, to provide a ground point for the metal envelope of the tube, or for any other type of metallic shield which may be provided in the tube structure. The amplified output of the first carrier frequency amplifier is supplied to a second carrier frequency amplifier through a coupling capacitor C5. It will be apparent to those skilled in the art that the first carrier frequency amplifier is arranged in the usual and well known manner of a resistance-coupled amplifier stage. The remainder of the receiving appaartus includes the second carrier frequency amplifier, which may be arranged in a manner similar to that shown in detail for the first carrier frequency amplifier, a limiter LIM, a discriminator DISC, an audio amplifier AA, and a loud speaker LS. The detailed circuits for this latter portion of the receiving apparatus are not shown, since they may be arranged in any of the manners well known in the art, and their particular construction is not a feature of my invention.

It will be apparent from the foregoing that incoming carrier frequency energy, whether modulated or not, is passed by the receiving filter to the first carrier frequency amplifier, where it is amplified and supplied to the second carrier frequency amplifier, and thence to the limiter, discriminator, audio amplifier, and to the loud speaker LS. When the incoming energy is modulated, the modulated energy is amplified in the same manner, and is demodulated by the discriminator DISC in the usual manner to reproduce the modulation in the loud speaker LS.

It can be seen that the receiving apparatus will be operated by energy supplied by the associated transmitter when the push-to-talk button PB is depressed, the carrier frequency energy supplied by the transmitter TR flowing through the input filter and through the receiving apparatus so that it will be supplied to the loud speaker LS.

Referring now to the apparatus of Fig. 2 indicated by the bracket as the frequency determining unit, there is shown a crystal oscillator of conventional construction, including the crystal X and the resistor R1 connected across the control grid and cathode of a triode tube VT1, with a resonant or tank circuit connected to the plate of the tube, the tank circuit comprising the capacitor C1 and the inductance L1. The tube VT1 is provided with an indirectly heated cathode, and this portion of the apparatus will be recognized by those skilled in the art as comprising a conventional crystal oscillator circuit, in which the oscillations are maintained within very close frequency limits by the frequency determined by the crystal and the resonant tank circuit. Connections are made to this circuit through a plug coupler, shown schematically, and including the terminal pins P1, P2, P4, P6, P7, and P8. This plug coupler is arranged and designed in the same manner as the base of the usual vacuum tube, so that the plug coupler can be inserted in the socket of a vacuum tube to establish connection with the various socket terminals therein as indicated by the legend on the drawing. Physically, the frequency determining unit may comprise a small case containing the various components, and including a cable for connecting the circuit components with a separate plug coupler, or the apparatus may be arranged in such manner that the plug coupler forms a portion of the case, so that the entire assembly is arranged to plug into an ordinary vacuum tube socket. In either event, connections are established with the circuit connected to vacuum tube socket by way of the terminal pins of the plug coupler. Accordingly, it will be seen that with the frequency determining unit of Fig. 2 having its plug coupler plugged in the tube socket normally occupied by the tube VT2, Fig. 1, a plurality of circuit connections will be established between the circuits of the receiving apparatus and the circuits incorporated in the frequency determining unit. These circuits will now be traced in detail.

At this time, energy is supplied to the plate or anode of the tube VT1 of the crystal oscillator in the frequency determining unit by a circuit which may be traced from B(+), through the resistor R3, through terminal S6 of the tube socket and pin P6 of the plug coupler to the plate or anode of tube VT1 through the inductance L1. The cathode of tube VT1 is connected to ground through pin P1 of the plug coupler and terminal S1 of the tube socket. Heater energy is supplied to the heater of tube VT1 by a circuit including the pins P2 and P7 which engage terminals S2 and S7 of the tube socket, which in turn, as previously pointed out, are connected to the source of energy for normally supplying heater energy to the tube VT2. Accordingly, with energy thus supplied to the crystal oscillator in the frequency determining unit, the parts are proportioned and arranged so that the oscillator will operate to generate a frequency determined by the crystal and the parameters of the resonant or tank circuit, which generated frequency is assumed to be the standard frequency to which the transmitter is to be tuned. At this time, a portion of the oscillating energy developed by the crystal oscillator in the frequency determining unit is supplied to the second carrier frequency amplifier by a circuit including the capacitor C7 in the frequency determining unit, the pin P8 of the plug coupler and terminal S8 of the tube circuit, and the coupling capacitor C5. Accordingly, it will be seen that energy at the standard carrier frequency is supplied to the second carrier frequency amplifier from the frequency determining unit.

In addition to the standard frequency supplied from the frequency determining unit, energy can also be supplied to the second carrier frequency amplifier from the input filter of the receiving apparatus, by a circuit which includes terminal S4 of the socket for tube VT2, the pin P4 of the plug coupler, capacitor C2 in the frequency determining unit, pin P8 in the plug coupler and terminal S8 of the tube socket, and capacitor C5.

It will be apparent that, with the frequency determining unit plugged into the first carrier frequency amplifier stage to replace the vacuum tube VT2 which is normally utilized in this stage, energy at two different frequencies can be supplied to the second carrier frequency amplifier, namely the standard frequency generated by the crystal oscillator in the frequency determining unit, and carrier frequency supplied from the associated transmitter through the receiving or input filter. These two frequencies supplied to the second carrier frequency amplifier are amplified and then supplied to the limiter and discriminator, and, since these circuits are non-linear in nature, the output of these circuits will contain the difference or beat frequency between the incoming or carrier frequency and the standard frequency supplied by the crystal oscillator. This beat frequency is amplified by the audio amplifier and supplied to the loud speaker where it is audible to the operator of the apparatus.

With the transmitter TR in operation as a result of the operation of the push-to-talk button PB, the transmitter output is supplied through the input filter of the receiver, mixed with the standard frequency supplied by the frequency determining unit, and the beat frequency is supplied through the remainder of the receiving apparatus to produce sound in the loudspeaker LS, the frequency of this sound being proportional to the difference between the standard frequency and the frequency of the transmitter carrier. Accordingly, the transmitter may now be adjusted by tuning the oscillator circuit of the transmitter so that the beat frequency is diminished to the point where it is no longer audible. At this time, the standard frequency supplied by the crystal oscillator in the frequency determining unit and the carrier frequency of transmitter TR will be equal within the limits of plus or minus 16 cycles per second, this being the lowest frequency at which a continuous sound is perceived by the human ear.

After the transmitter TR has been adjusted to produce a zero beat frequency, the plug coupler of the frequency determining unit is removed from the socket for tube VT2 and the tube VT2 is replaced therein, whereupon the apparatus is restored to its normal position, with the assurance that the carrier frequency of transmitter TR is at its assigned frequency within very close limits.

As previously pointed out, the provision of frequency determining means embodying my invention as described above provides a number of advantages, particularly for use in connection with mobile communication equipment. It will be noted that the apparatus requires no external power, the power for the operation of the crystal oscillator being furnished by the circuits which normally supply energy to the first carrier frequency amplifier stage, so that there is no cost involving replacement of batteries, or determination of proper voltages etc., for the operation of the apparatus. Moreover, the frequency determining means according to my invention is extremely simple in its operation, so that the transmitters of the communication system may be adjusted by relatively non-skilled personnel. A further advantage of frequency determining means as provided by my invention resides in the fact that the apparatus is simple and may be built in a very compact and rugged form suitable for withstanding the abuse which it necessarily must receive when used with equipment of the type described.

It will be obvious to those skilled in the art that frequency determining means of the type herein described is not limited to use with communication systems employing metallic transmission channels, but obviously may be applied equally as well to radiant energy or "radio" communication systems which employ a common signal frequency for transmission by all stations.

Although I have herein shown and described only one form of frequency determining means embodying my invention, it is to be understood that various changes and modifications may be made therein within the scope of the appended claims without departing from the spirit and scope of my invention.

Having thus described my invention, what I claim is:

1. In a communication system of the type employing a single carrier frequency for transmission and reception at all stations, having transmitters adapted when energized to supply carrier frequency energy to a communication channel and receivers adapted to receive carrier frequency energy from said communication channel, said receivers including input filter means, a first carrier frequency amplifier stage having an input circuit, an output circuit, and a power supply circuit, said input circuit being connected to said input filter means for supplying carrier frequency energy from said communication channel to said first carrier frequency amplifier stage, and demodulating means for each receiver connected to said output circuit of said first carrier frequency amplifier stage for reproducing the modulation of carrier frequency energy supplied thereto, the combination with the foregoing of frequency determining means for determining the frequency of carrier frequency energy supplied by said transmitters, comprising a standard frequency generator, and means for detachably connecting said standard frequency generator to said receiver in lieu of said first carrier frequency amplifier stage, including circuit means for connecting said power supply circuit to said standard frequency generator, and circuit means for establishing a connection between said input filter means and said demodulating means for at times supplying energy at a standard frequency to a selected one of said receivers simultaneously with carrier frequency energy supplied to said receiver from the associated transmitter, whereby the difference in frequency between said standard frequency and the carrier frequency of the associated transmitter is reproduced by said demodulating means as an audible signal.

2. In a communication system of the type employing a single carrier frequency for transmission and reception at all stations, having transmitters adapted when energized to supply carrier frequency energy to a communication channel and receivers adapted to receive carrier frequency energy from said communication channel, said receivers including input filter means, a first carrier frequency amplifier stage having an input circuit, an output circuit, and a power supply circuit, said input circuit being connected to said input filter means for supplying carrier frequency energy from said communication channel to said first carrier frequency amplifier stage, and demodulating means for each receiver connected to said output circuit of said first carrier frequency amplifier stage for reproducing the modulation of carrier frequency energy supplied thereto, the combination with the foregoing of frequency determining means for determining the frequency of carrier frequency energy supplied by said transmitters, comprising an oscillator selected and arranged to generate energy of a substantially constant standard frequency when energized and means for detachably connecting said oscillator to said receiver in lieu of said first carrier frequency amplifier stage, including circuit means for connecting said power supply circuit to said oscillator, and other circuit means for connecting the input filter means to the demodulating means, for at times supplying energy at standard frequency to a selected one of said receivers simultaneously with carrier frequency energy supplied to said receiver from the associated transmitter, whereby the difference in frequency between said standard frequency and the carrier frequency of the associated transmitter is reproduced by said demodulating means as an audible signal.

3. In a communication system of the type employing a single carrier frequency for transmission and reception at all stations, having transmitters adapted when energized to supply carrier frequency energy to a communication channel and receivers adapted to receive carrier frequency energy from said communication channel, said receivers including input filter means, a first carrier frequency amplifier stage having an input circuit, an output circuit, and a power supply circuit, said input circuit being connected to said input filter means for supplying carrier frequency energy from said communication channel to said first carrier frequency amplifier stage, and demodulating means for each receiver connected to said output circuit of said first carrier frequency amplifier stage for reproducing the modulation of carrier frequency energy supplied thereto, said first carrier frequency amplifier stage including an amplifying device arranged to be detachably connected to said input circuit, said output circuit, and said power supply circuit, the combination with the foregoing of frequency determining means for determining the frequency of carrier frequency energy supplied by said transmitter, comprising an oscillator selected and arranged to generate energy of a substantially constant standard frequency when energized and means for detachably connecting said oscillator to said receiver in lieu of said amplifying device of the first carrier frequency stage, including circuit means for connecting said power supply circuit to said oscillator, other circuit means for connecting the output of said oscillator to the output of said first carrier frequency stage, and still other circuit means for connecting said input circuit of said first carrier frequency stage to the output of said first carrier frequency stage; for at times supplying energy at standard frequency to a selected one of said receivers simultaneously with carrier frequency energy from the associated transmitter, whereby the difference in frequency between said standard frequency and the carrier frequency of the associated transmitter is reproduced by said demodulating means as an audible signal.

4. A detachable frequency determining unit for determining the proper carrier frequency in a communications system, said communications system being of the type employing a single carrier frequency for transmission and reception at all stations, having transmitters which when energized supply carrier frequency energy to a communication channel and receivers adapted to receive carrier frequency energy from said communication channel, said receivers including input filter means, a first carrier frequency amplifier stage having an input circuit, an output circuit, and a power supply circuit, said input circuit being connected to said input filter means for supplying carrier frequency energy from said communication channel to said first carrier frequency amplifier stage, and demodulating means for each receiver connected to said output circuit of said first carrier frequency amplifier stage for reproducing the modulation of carrier frequency energy supplied thereto, said first carrier frequency amplifier stage including an amplifying device arranged to be detachably connected to said input circuit, said output circuit, and said power supply circuit; said detachable frequency determining unit comprising an oscillator selected and arranged to generate energy of a substantially constant standard frequency when energized and means for detachably connecting said oscillator to said receiver in lieu of said amplifying device of said first carrier frequency stage, and still other circuit means for connecting said input circuit of said first carrier frequency stage to the output circuit of said first carrier frequency stage through said oscillator circuit; for at times supplying energy at standard frequency to a selected one of said receivers simultaneously with carrier frequency energy from the associated transmitter, whereby the difference in frequency between said standard frequency and the carrier frequency of the associated transmitter is reproduced by said demodulating means as an audible signal.

References Cited in the file of this patent

UNITED STATES PATENTS

| | | |
|---|---|---|
| 2,080,423 | Kane | May 18, 1937 |
| 2,121,434 | Klinedinst et al. | June 21, 1938 |
| 2,324,915 | Dow | July 20, 1943 |
| 2,388,052 | Hansell | Oct. 30, 1945 |
| 2,560,320 | Winkler | July 10, 1951 |

OTHER REFERENCES

Radio-Craft, December 1947, "This Radio Services Itself," pages 26 and 27.